US012299146B2

(12) United States Patent
Schwartz et al.

(10) Patent No.: US 12,299,146 B2
(45) Date of Patent: May 13, 2025

(54) SECURE SHARING OF DOCUMENTS CREATED VIA CONTENT MANAGEMENT REPOSITORY

(71) Applicant: Rocket Software Technologies, Inc., Waltham, MA (US)

(72) Inventors: Matthew Schwartz, Stamford, CT (US); Srihari Ranganathan, Chennai (IN)

(73) Assignee: Rocket Software Technologies, Inc., Waltham, MA (US)

( * ) Notice: Subject to any disclaimer, the term of this patent is extended or adjusted under 35 U.S.C. 154(b) by 303 days.

(21) Appl. No.: 17/498,431

(22) Filed: Oct. 11, 2021

(65) Prior Publication Data

US 2022/0114267 A1     Apr. 14, 2022

Related U.S. Application Data

(60) Provisional application No. 63/091,129, filed on Oct. 13, 2020.

(51) Int. Cl.
    *G06F 21/60*          (2013.01)
    *G06F 21/10*          (2013.01)
                 (Continued)

(52) U.S. Cl.
    CPC ............ *G06F 21/604* (2013.01); *G06F 21/10* (2013.01); *G06F 21/62* (2013.01); *H04L 63/102* (2013.01); *H04L 63/104* (2013.01)

(58) Field of Classification Search
    CPC ..... G06F 21/604; G06F 21/62; H04L 63/102; H04L 63/104
See application file for complete search history.

(56) References Cited

U.S. PATENT DOCUMENTS

| 5,321,610 A | 6/1994 | Breslin |
| 5,528,263 A | 6/1996 | Platzker et al. |

(Continued)

FOREIGN PATENT DOCUMENTS

| EP | 3430529 A1 | 1/2019 |
| EP | 3714604 A1 | 9/2020 |

(Continued)

OTHER PUBLICATIONS

"International Search Report" and "Written Opinion of the International Searching Authority," Patent Cooperation Treaty Application No. PCT/US2017/022295, Jun. 1, 2017, 9 pages.

(Continued)

*Primary Examiner* — Han Yang
*Assistant Examiner* — Zhe Liu
(74) *Attorney, Agent, or Firm* — Danielson Legal LLC

(57) ABSTRACT

A system for secure sharing of documents via a content management repository is provided. The system includes a content management unit, a filtering unit, a graphical user interface, and a memory communicatively coupled to the content management unit. The content management unit is configured to receive content restriction rules for content stored in the content management repository. The content management unit is further configured to inject the content restriction rules into policy rules. The content management unit is configured to intercept an Application Programming Interface call for the content from a user. The filtering unit is configured to dynamically filter the content based on the content restriction rules. The graphical user interface is configured to render the filtered content to display the filtered content to the user.

20 Claims, 6 Drawing Sheets

(51) Int. Cl.
  *G06F 21/62* (2013.01)
  *H04L 9/40* (2022.01)

(56) References Cited

U.S. PATENT DOCUMENTS

| | | | |
|---|---|---|---|
| 5,742,285 | A | 4/1998 | Ueda |
| 6,069,957 | A | 5/2000 | Richards |
| 6,208,345 | B1 | 3/2001 | Sheard et al. |
| 6,331,855 | B1 | 12/2001 | Schauser |
| 6,427,140 | B1 * | 7/2002 | Ginter .............. H04L 9/3218 |
| | | | 713/193 |
| 6,574,321 | B1 | 6/2003 | Cox et al. |
| 6,597,363 | B1 | 7/2003 | Duluk |
| 6,950,825 | B2 | 9/2005 | Chang et al. |
| 7,073,164 | B1 | 7/2006 | Knowles |
| 7,185,192 | B1 | 2/2007 | Kahn |
| 7,359,076 | B2 | 4/2008 | Uchino |
| 7,937,665 | B1 | 5/2011 | Vazquez et al. |
| 8,078,731 | B1 | 12/2011 | Bruder et al. |
| 8,667,456 | B1 | 3/2014 | Czymontek |
| 8,745,011 | B2 | 6/2014 | Kishi |
| 9,032,076 | B2 | 5/2015 | Buehler et al. |
| 9,053,295 | B1 | 6/2015 | Wick et al. |
| 9,213,707 | B2 | 12/2015 | Conner |
| 9,232,491 | B2 | 1/2016 | Mahaffey |
| 9,430,330 | B1 * | 8/2016 | Bardhan ............ G06F 11/1448 |
| 9,483,537 | B1 | 11/2016 | Peters et al. |
| 9,621,428 | B1 | 4/2017 | Lev et al. |
| 9,785,518 | B2 * | 10/2017 | Kanteti ............. G06F 11/1471 |
| 9,910,655 | B1 | 3/2018 | Ranganathan et al. |
| 10,162,624 | B1 | 12/2018 | Moturu et al. |
| 10,181,059 | B1 | 1/2019 | Brewton et al. |
| 10,355,864 | B2 | 2/2019 | Konduru |
| 10,318,762 | B1 | 6/2019 | Buckingham et al. |
| 10,348,505 | B1 | 7/2019 | Crawforth et al. |
| 10,812,611 | B2 | 10/2020 | Bennet et al. |
| 10,877,740 | B2 | 12/2020 | Bennet et al. |
| 10,942,991 | B1 * | 3/2021 | Kidd ................ G06F 16/9574 |
| 11,055,067 | B2 | 7/2021 | Thangaraj et al. |
| 11,057,500 | B2 | 7/2021 | Aragón et al. |
| 11,086,751 | B2 | 8/2021 | Moresmau et al. |
| 11,172,042 | B2 | 11/2021 | Bennet et al. |
| 11,269,660 | B2 | 3/2022 | Yueh |
| 2002/0099952 | A1 | 7/2002 | Lambert et al. |
| 2002/0103731 | A1 | 8/2002 | Barnard et al. |
| 2002/0184610 | A1 | 12/2002 | Chong et al. |
| 2002/0196277 | A1 | 12/2002 | Bushey et al. |
| 2003/0046401 | A1 | 3/2003 | Abbott et al. |
| 2003/0079052 | A1 | 4/2003 | Kushnirskiy |
| 2004/0003119 | A1 | 1/2004 | Munir et al. |
| 2004/0003371 | A1 | 1/2004 | Coulthard et al. |
| 2004/0078373 | A1 | 4/2004 | Ghoneimy et al. |
| 2004/0128001 | A1 | 7/2004 | Levin et al. |
| 2004/0153994 | A1 | 8/2004 | Bates et al. |
| 2004/0177323 | A1 | 9/2004 | Kaasila et al. |
| 2004/0267749 | A1 | 12/2004 | Bhat et al. |
| 2005/0038764 | A1 | 2/2005 | Minsky et al. |
| 2005/0065845 | A1 | 3/2005 | DeAngelis |
| 2005/0235258 | A1 | 10/2005 | Wason |
| 2005/0278695 | A1 | 12/2005 | Synovic |
| 2006/0026591 | A1 | 2/2006 | Backhouse |
| 2006/0031854 | A1 | 2/2006 | Godwin |
| 2006/0036448 | A1 | 2/2006 | Haynie et al. |
| 2006/0036941 | A1 | 2/2006 | Neil |
| 2006/0039466 | A1 | 2/2006 | Emerson et al. |
| 2006/0111888 | A1 | 5/2006 | Hiew et al. |
| 2006/0184925 | A1 | 8/2006 | Ficatier et al. |
| 2006/0251047 | A1 | 11/2006 | Shenfield et al. |
| 2006/0265719 | A1 | 11/2006 | Asti |
| 2006/0271528 | A1 | 11/2006 | Gorelik |
| 2006/0294151 | A1 | 12/2006 | Wong |
| 2007/0016624 | A1 | 1/2007 | Powers et al. |
| 2007/0028286 | A1 | 2/2007 | Greene et al. |
| 2007/0033637 | A1 | 2/2007 | Yami et al. |
| 2007/0073671 | A1 | 3/2007 | McVeigh et al. |
| 2007/0094594 | A1 | 4/2007 | Matichuk |
| 2007/0135936 | A1 | 6/2007 | Dumas |
| 2007/0156764 | A1 | 7/2007 | O'Connell et al. |
| 2007/0180367 | A1 | 8/2007 | Chiang |
| 2007/0180444 | A1 | 8/2007 | Hoover et al. |
| 2007/0198450 | A1 | 8/2007 | Khalsa |
| 2007/0208685 | A1 | 9/2007 | Blumenau |
| 2007/0266394 | A1 | 11/2007 | Odent et al. |
| 2007/0294406 | A1 | 12/2007 | Suer et al. |
| 2008/0109292 | A1 | 5/2008 | Moore |
| 2008/0126932 | A1 | 5/2008 | Elad et al. |
| 2008/0141141 | A1 | 6/2008 | Moore |
| 2008/0189617 | A1 | 8/2008 | Covell et al. |
| 2008/0209390 | A1 | 8/2008 | Dutta et al. |
| 2008/0229303 | A1 | 9/2008 | Carteri et al. |
| 2008/0281727 | A1 | 11/2008 | Moss |
| 2009/0024589 | A1 | 1/2009 | Sood |
| 2009/0024660 | A1 | 1/2009 | Borgsmidt et al. |
| 2009/0025063 | A1 | 1/2009 | Thomas |
| 2009/0083306 | A1 | 3/2009 | Sichi et al. |
| 2009/0094112 | A1 | 4/2009 | Cesarini et al. |
| 2009/0124387 | A1 | 5/2009 | Perlman et al. |
| 2009/0249290 | A1 | 10/2009 | Jenkins et al. |
| 2009/0249446 | A1 | 10/2009 | Jenkins et al. |
| 2010/0088317 | A1 * | 4/2010 | Bone ................... G06F 16/134 |
| | | | 709/219 |
| 2010/0106560 | A1 | 4/2010 | Li et al. |
| 2010/0114628 | A1 | 5/2010 | Adler et al. |
| 2010/0131857 | A1 | 5/2010 | Prigge |
| 2010/0153866 | A1 | 6/2010 | Sharoni |
| 2010/0169265 | A1 | 7/2010 | Ristock et al. |
| 2010/0225658 | A1 | 9/2010 | Coleman |
| 2010/0226441 | A1 | 9/2010 | Tung et al. |
| 2010/0231599 | A1 | 9/2010 | Tung et al. |
| 2010/0245563 | A1 | 9/2010 | Golovchinsky et al. |
| 2010/0250497 | A1 | 9/2010 | Redlich et al. |
| 2010/0274815 | A1 | 10/2010 | Vanasco |
| 2011/0004564 | A1 | 1/2011 | Rolia et al. |
| 2011/0029947 | A1 | 2/2011 | Markovic |
| 2011/0078708 | A1 | 3/2011 | Dokovski et al. |
| 2011/0107298 | A1 | 5/2011 | Sebastian |
| 2011/0107309 | A1 | 5/2011 | Baron |
| 2011/0107313 | A1 | 5/2011 | Baron |
| 2011/0246904 | A1 | 10/2011 | Pinto et al. |
| 2011/0276636 | A1 | 11/2011 | Cheng et al. |
| 2012/0072509 | A1 | 3/2012 | Booth |
| 2012/0075333 | A1 | 3/2012 | Chen et al. |
| 2012/0130906 | A1 | 5/2012 | Klinker |
| 2012/0310381 | A1 | 12/2012 | Karaffa |
| 2012/0310875 | A1 | 12/2012 | Prahlad et al. |
| 2012/0324358 | A1 | 12/2012 | Jooste |
| 2012/0331527 | A1 | 12/2012 | Walters et al. |
| 2013/0031158 | A1 | 1/2013 | Salsburg |
| 2013/0117662 | A1 | 5/2013 | Shan et al. |
| 2013/0144901 | A1 * | 6/2013 | Ho ....................... G06F 16/248 |
| | | | 707/769 |
| 2013/0151557 | A1 | 6/2013 | Shanken et al. |
| 2013/0174028 | A1 | 7/2013 | Grossman et al. |
| 2013/0177662 | A1 | 7/2013 | Msika |
| 2013/0275475 | A1 | 10/2013 | Ahlborn |
| 2013/0332423 | A1 | 12/2013 | Puri et al. |
| 2013/0339872 | A1 | 12/2013 | Shuster |
| 2014/0026113 | A1 | 1/2014 | Farooqi |
| 2014/0032875 | A1 | 1/2014 | Butler |
| 2014/0047011 | A1 | 2/2014 | Lahav et al. |
| 2014/0047413 | A1 | 2/2014 | Sheive et al. |
| 2014/0075407 | A1 | 3/2014 | Donis et al. |
| 2014/0089388 | A1 | 3/2014 | Curry et al. |
| 2014/0114907 | A1 | 4/2014 | Kozina et al. |
| 2014/0114962 | A1 | 4/2014 | Rosenburg et al. |
| 2014/0123237 | A1 * | 5/2014 | Gaudet ................ H04L 63/205 |
| | | | 726/4 |
| 2014/0207575 | A1 | 7/2014 | Freed-Finnegan et al. |
| 2014/0245199 | A1 | 8/2014 | Belotti et al. |
| 2014/0282453 | A1 | 9/2014 | O'Rourke et al. |
| 2014/0288923 | A1 | 9/2014 | Marian et al. |
| 2014/0288945 | A1 | 9/2014 | Boerner et al. |
| 2014/0317049 | A1 * | 10/2014 | DeRoller ............. G06Q 10/103 |
| | | | 707/608 |

(56) References Cited

U.S. PATENT DOCUMENTS

| | | | |
|---|---|---|---|
| 2014/0380105 A1 | 12/2014 | Michel et al. | |
| 2015/0006543 A1 | 1/2015 | Jin et al. | |
| 2015/0012478 A1 | 1/2015 | Mohammad et al. | |
| 2015/0046930 A1 | 2/2015 | Phadke | |
| 2015/0088933 A1 | 3/2015 | Schofield et al. | |
| 2015/0127660 A1 | 5/2015 | Zilberberg et al. | |
| 2015/0128105 A1 | 5/2015 | Sethi et al. | |
| 2015/0248280 A1 | 9/2015 | Pillay | |
| 2015/0293764 A1 | 10/2015 | Visvanathan | |
| 2015/0379303 A1 | 12/2015 | LaFever et al. | |
| 2016/0026968 A1 | 1/2016 | Fan et al. | |
| 2016/0034260 A1 | 2/2016 | Ristock et al. | |
| 2016/0034571 A1 | 2/2016 | Setayesh et al. | |
| 2016/0044380 A1 | 2/2016 | Barrett | |
| 2016/0070541 A1 | 3/2016 | Lee et al. | |
| 2016/0070812 A1* | 3/2016 | Murphy | G06F 21/6218 707/608 |
| 2016/0117159 A1 | 4/2016 | Balko | |
| 2016/0140204 A1 | 5/2016 | Brown et al. | |
| 2016/0253340 A1 | 9/2016 | Barth et al. | |
| 2016/0267060 A1 | 9/2016 | Skirpa et al. | |
| 2016/0267082 A1 | 9/2016 | Wong et al. | |
| 2016/0275439 A1 | 9/2016 | Avats | |
| 2016/0283200 A1 | 9/2016 | Standley et al. | |
| 2016/0299933 A1 | 10/2016 | Filipi et al. | |
| 2016/0321469 A1* | 11/2016 | Bhogal | G06F 16/3331 |
| 2016/0359711 A1 | 12/2016 | Deen et al. | |
| 2017/0034306 A1 | 2/2017 | Thangeswaran | |
| 2017/0039041 A1 | 2/2017 | Bommireddi | |
| 2017/0068395 A1 | 3/2017 | Massoudi | |
| 2017/0118284 A1 | 4/2017 | Chen et al. | |
| 2017/0123751 A1 | 5/2017 | Sigurösson et al. | |
| 2017/0154026 A1 | 6/2017 | Gong et al. | |
| 2017/0180284 A1 | 6/2017 | Smullen et al. | |
| 2017/0199936 A1 | 7/2017 | Steelberg et al. | |
| 2017/0228119 A1 | 8/2017 | Hosbettu et al. | |
| 2017/0269972 A1 | 9/2017 | Hosabettu et al. | |
| 2017/0270022 A1 | 9/2017 | Moresmau et al. | |
| 2017/0339564 A1 | 11/2017 | Momchilov et al. | |
| 2017/0344227 A1 | 11/2017 | Stoicov et al. | |
| 2017/0357814 A1 | 12/2017 | Mahaffey et al. | |
| 2017/0372442 A1 | 12/2017 | Mejias | |
| 2018/0089005 A1 | 3/2018 | Green | |
| 2018/0121841 A1 | 5/2018 | Harris | |
| 2018/0129497 A1 | 5/2018 | Biddle et al. | |
| 2018/0152460 A1 | 5/2018 | Lin et al. | |
| 2018/0167426 A1 | 6/2018 | Sigurdsson et al. | |
| 2018/0174104 A1 | 6/2018 | Schikora et al. | |
| 2018/0191761 A1 | 7/2018 | Lee et al. | |
| 2018/0197123 A1 | 7/2018 | Parimelazhagan et al. | |
| 2018/0322396 A1 | 11/2018 | Ahuja-Cogny et al. | |
| 2018/0367506 A1 | 12/2018 | Ford et al. | |
| 2019/0081935 A1 | 3/2019 | Broussard et al. | |
| 2019/0129734 A1 | 5/2019 | Yang et al. | |
| 2019/0158630 A1 | 5/2019 | Aragón et al. | |
| 2019/0196793 A1 | 6/2019 | Jaiprakash | |
| 2019/0205111 A1 | 7/2019 | Bennet et al. | |
| 2019/0207929 A1* | 7/2019 | Koorapati | G06F 3/0652 |
| 2019/0208031 A1 | 7/2019 | Bennet et al. | |
| 2019/0238467 A1 | 8/2019 | Guan et al. | |
| 2019/0238688 A1 | 8/2019 | Bermundo et al. | |
| 2019/0243742 A1 | 8/2019 | Natari | |
| 2019/0294707 A1* | 9/2019 | Ramaswamy | G06Q 10/10 |
| 2019/0332357 A1 | 10/2019 | Reddy | |
| 2019/0342404 A1 | 11/2019 | Kundu et al. | |
| 2019/0369969 A1 | 12/2019 | Donohoe et al. | |
| 2020/0026735 A1 | 1/2020 | Przada | |
| 2020/0042648 A1 | 2/2020 | Rao | |
| 2020/0050983 A1 | 2/2020 | Balasubramanian et al. | |
| 2020/0110902 A1* | 4/2020 | Zakour | G06F 16/22 |
| 2020/0133982 A1 | 4/2020 | Thangeswaran et al. | |
| 2020/0259865 A1* | 8/2020 | Raff | H04L 43/0876 |
| 2020/0301917 A1* | 9/2020 | Niu | G06F 16/248 |
| 2020/0348964 A1 | 11/2020 | Anand et al. | |
| 2020/0356365 A1 | 11/2020 | Pezaris | |
| 2020/0409665 A1 | 12/2020 | Swaminathan et al. | |
| 2021/0004711 A1 | 1/2021 | Gupta et al. | |
| 2021/0019574 A1 | 1/2021 | Voicu | |
| 2021/0037110 A1 | 2/2021 | Bennet et al. | |
| 2021/0092154 A1 | 3/2021 | Kumar et al. | |
| 2021/0107164 A1 | 4/2021 | Singh et al. | |
| 2021/0109503 A1 | 4/2021 | Singh et al. | |
| 2021/0109742 A1 | 4/2021 | Bennet et al. | |
| 2021/0110345 A1 | 4/2021 | Iyer et al. | |
| 2021/0117162 A1 | 4/2021 | Thangaraj et al. | |
| 2021/0117210 A1 | 4/2021 | Yueh | |
| 2021/0117302 A1 | 4/2021 | Kadakia et al. | |
| 2021/0117394 A1 | 4/2021 | Moresmau et al. | |
| 2021/0117517 A1 | 4/2021 | Bregman et al. | |
| 2021/0117562 A1 | 4/2021 | Balan et al. | |
| 2021/0117563 A1 | 4/2021 | Moresmau et al. | |
| 2021/0117895 A1 | 4/2021 | Tondevold et al. | |
| 2021/0120044 A1 | 4/2021 | Balan et al. | |
| 2021/0141920 A1* | 5/2021 | Khurana | G06F 21/31 |
| 2021/0194994 A1 | 6/2021 | Aragón et al. | |
| 2021/0286597 A1 | 9/2021 | Thangaraj et al. | |
| 2021/0303528 A1* | 9/2021 | Meister | G06F 16/162 |
| 2021/0357503 A1 | 11/2021 | Moresmau et al. | |
| 2022/0060558 A1 | 2/2022 | Bennet et al. | |
| 2022/0116787 A1 | 4/2022 | Balan et al. | |

FOREIGN PATENT DOCUMENTS

| | | |
|---|---|---|
| EP | 3732566 | 11/2020 |
| EP | 3732582 | 11/2020 |
| WO | WO2008003593 A1 | 1/2008 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019099140 A1 | 5/2019 |
| WO | WO2019133208 A1 | 7/2019 |
| WO | WO2019133209 A1 | 7/2019 |
| WO | WO2020263573 A1 | 12/2020 |
| WO | WO2021076310 A1 | 4/2021 |
| WO | WO2021076311 A1 | 4/2021 |
| WO | WO2021076312 A1 | 4/2021 |
| WO | WO2021076324 A1 | 4/2021 |
| WO | WO2021076520 A1 | 4/2021 |
| WO | WO2021076521 A1 | 4/2021 |
| WO | WO2021076791 A1 | 4/2021 |
| WO | WO2021076921 A1 | 4/2021 |

OTHER PUBLICATIONS

"International Search Report" and "Written Opinion of the International Searching Authority," Patent Cooperation Treaty Application No. PCT/US2018/056196, Dec. 26, 2018, 8 pages.

"International Search Report" and "Written Opinion of the International Searching Authority," Patent Cooperation Treaty Application No. PCT/US2018/064127, Feb. 11, 2019, 6 pages.

"International Search Report" and "Written Opinion of the International Searching Authority," Patent Cooperation Treaty Application No. PCT/US2018/064122, Mar. 18, 2019, 8 pages.

"Extended European Search Report" and "Written Opinion", European Application No. 17767331.6, Nov. 14, 2019, 6 pages.

"International Search Report" and "Written Opinion of the International Searching Authority," Patent Cooperation Treaty Application No. PCT/US2020/037028, Aug. 28, 2020, 13 pages.

"International Search Report" and "Written Opinion of the International Searching Authority," Patent Cooperation Treaty Application No. PCT/US2020/053141, Jan. 12, 2021, 8 pages.

"International Search Report" and "Written Opinion of the International Searching Authority," Patent Cooperation Treaty Application No. PCT/US2020/053419, Jan. 14, 2021, 14 pages.

"International Search Report" and "Written Opinion of the International Searching Authority," Patent Cooperation Treaty Application No. PCT/US2020/053138, Jan. 12, 2021, 8 pages.

"International Search Report" and "Written Opinion of the International Searching Authority," Patent Cooperation Treaty Application No. PCT/US2020/053139, Jan. 11, 2021, 8 pages.

(56) References Cited

OTHER PUBLICATIONS

"International Search Report" and "Written Opinion of the International Searching Authority," Patent Cooperation Treaty Application No. PCT/US2020/056026, Jan. 19, 2021, 16 pages.
"International Search Report" and "Written Opinion of the International Searching Authority," Patent Cooperation Treaty Application No. PCT/US2020/055829, Jan. 19, 2021, 18 pages.
"International Search Report" and "Written Opinion of the International Searching Authority," Patent Cooperation Treaty Application No. PCT/US2020/055418, Jan. 28, 2021, 8 pages.
"International Search Report" and "Written Opinion of the International Searching Authority," Patent Cooperation Treaty Application No. PCT/US2020/055420, Feb. 1, 2021, 8 pages.
Bourgouin et al., "Towards a Process Analysis Approach to Adopt Robotic Process Automation", IEEE, 2018, 8 pages.
"Extended European Search Report" and "Written Opinion", European Application No. 18879227.9, Mar. 15, 2021, 9 pages.
"Extended European Search Report" and "Written Opinion", European Application No. 18895108.1, Aug. 19, 2021, 8 pages.
"Extended European Search Report" and "Written Opinion", European Application No. 18895245.1, Aug. 25, 2021, 8 pages.
"International Search Report" and "Written Opinion of the International Searching Authority," Patent Cooperation Treaty Application No. PCT/US2021/054415, Jan. 19, 2022, 8 pages.
Kuligowski, Kiely; "What Is a Document Repository?" business.com. [Retrieved on Dec. 12, 2021]; <URL: https://www.business.com/articles/what-is-document-repository/>, Jun. 25, 2020, 10 pages.
"International Search Report" and "Written Opinion of the International Searching Authority," Patent Cooperation Treaty Application No. PCT/US2021/054416, Jan. 19, 2022, 9 pages.
Choudhri et al., "PatientService: Electronic Patient Record Redaction and Delivery in Pervasive Environments." Proceedings 5th International Workshop on Enterprise Networking and Computing in Healthcare Industry (HealthCom), IEEE, Jul. 2003, 7 pages.
Extended European Search Report for European Pat. Appl. No. 21880848.3, Sep. 10, 2024, 8 pages.

\* cited by examiner

SECURE SHARING OF DOCUMENTS CREATED VIA CONTENT MANAGEMENT REPOSITORY

CROSS REFERENCE TO RELATED APPLICATIONS

The present application claims priority of U.S. Provisional Patent Application No. 63/091,129 filed on Oct. 13, 2020, entitled "Secure Sharing of Documents Created in a Software System via a Content Management Repository," which is incorporated herein by reference in its entirety for all purposes.

TECHNICAL FIELD

The present disclosure relates generally to data processing and, more specifically, to secure sharing of documents via a content management repository.

BACKGROUND

In the past, users exchanged documents in many ways, e.g., by attaching the documents to emails or by other means. This resulted in loss of control because after sending a document, the document owner usually does not know what recipients of the document do with the document, whom the documents is shares with, or what happens with the document in general. Moreover, a security issue may arise if the document has sensitive information/content that the document owner does not want to share. With conventional document sharing approaches, it is difficult to control versions and access rights related to documents.

Desktop and SaaS hosted content creation software applications, such as Microsoft 365, allow users to create new files and collaboratively manipulate them. These applications typically offer simple file-level read and/or write access restrictions to users in an enterprise. However, the existing solutions do not offer dynamic access control based on various business rules. Even though users may not be able to edit or delete documents, they can see the same content as the users with higher levels of access, which is a fundamental problem.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure are directed to systems and methods for secure sharing of documents via a content management repository. According to an example embodiment, a system for secure sharing of documents via a content management repository is provided. The system may include a content management unit, a filtering unit, a graphical user interface, and a memory communicatively coupled to the content management unit. The content management unit may be configured to receive content restriction rules for content stored in the content management repository. The content management unit may be further configured to inject the content restriction rules into policy rules. The content management unit may be configured to intercept an Application Programming Interface (API) call for the content from a user. The filtering unit may be configured to dynamically filter the content based on the content restriction rules. The graphical user interface may be configured to render the filtered content to display the filtered content to the user.

According to another example embodiment, a method for secure sharing of documents via a content management repository is provided. The method may commence with receiving, by a content management unit, content restriction rules for content stored in the content management repository. Upon receiving the content restriction rules, the content restriction rules may be injected by the content management unit into policy rules. The method may further include intercepting, by the content management unit, an API call for the content from a user. Upon intercepting the API call, the content may be dynamically filtered by a filtering unit, based on the content restriction rules. Upon filtering the content, the filtered content may be rendered via a graphical user interface and displayed to the user.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
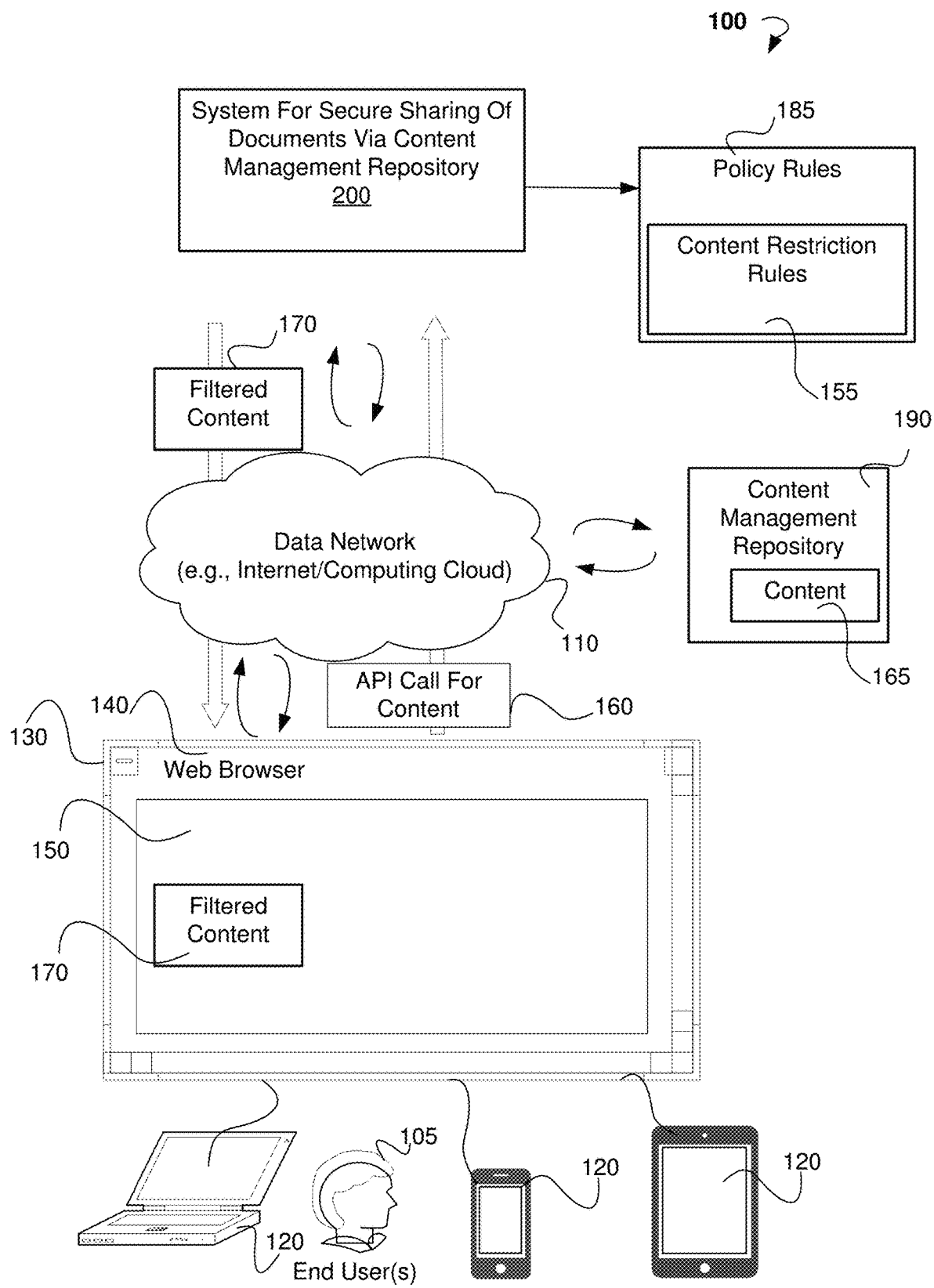
FIG. 1 illustrates an environment within which systems and methods for secure sharing of documents via a content management repository can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In general, the present disclosure relates to systems and methods for secure sharing of documents via a content management repository. A system for secure sharing of documents via a content management repository is also referred to herein as a content management system or just a system. The system allows content managers to secure sharing of content by archiving the content from within an originating application, configuring content restriction rules that apply to all or a subset of documents in a content management system, and automatically applying redaction, retention, and other rules dynamically when the content is shared through the content management system. For example, the system can restrict printing, sharing, changing metadata of a document, redacting documents based on the permissions associated with the user that accesses a document, and so forth. The system further allows adding capabilities to a document collaboration system in which users can collaborate on the same documents, such as, for example, Google Docs®, Dropbox®, and so forth. The system can provide a policy-based redaction of documents by specifying what metadata of the document the user can see. This approach provides a fine-graded control over the access to the document or portions of the document. By using the system of the present disclosure, organizations are able to set complex restrictions on the content applied without the need for continuous supervision. Upon applying these restrictions, the content can be safely and securely shared by end users.

The system may include a content management unit configured to receive content restriction rules for content stored in the content management repository. The content management unit may inject the content restriction rules into policy rules. When a user requests access to the content, the content management unit may intercept an API call for the content from a user. The system may include a filtering unit configured to dynamically filter the content based on the content restriction rules. The system may further have a graphical user interface configured to render the filtered content to the user.

Secure content sharing embodies the automated enforcement of dynamic access restrictions to content when shared between users of a content management system. This can be implemented through an integration of the content management system into a content creation system, ingestion of new content into a content management repository of the content management system, and calculating and applying rule sets to such content when the content is shared with other users.

The content management system can be configured with a set of content restriction rules. The content restriction rules can include assignment of users and user groups to content categories with a flag that designates access to content as granted or blocked. Redaction policies can automatically hide designated content when displayed to an end user. Users and user groups can be assigned to content categories with a flag which designates that access to unredacted content as granted or blocked. The content restriction rules can also allow comparing against content categories to determine whether access is granted or denied.

The system of the present disclosure can be integrated into existing content management solutions for content creation and storage. For example, the system can be integrated into a content creation system, such as Microsoft 365® or Google Docs®, as an extension or add-in to facilitate archiving of content into a content management repository of a content management system.

A user can create content (e.g., a document) and click a button that triggers an add-in associated with the system of the present disclosure to save the content to the content management repository. The user may be prompted to fill in any required fields of information concerning the content as configured by an administrator of the content management system. Once the information received from the user is captured, the content management repository may categorize the content either automatically, based on predetermined configurations, or based on a user input at the time of archivation.

The user can be presented with a panel or window displaying information about the archive, including a fully formed HyperText Transfer Protocol (HTTP) Uniform Resource Locator (URL) referencing the archive as a resource within the content management repository. When the user wants to share the content with other users, the user may share the URL generated by the system for the content.

Users who open the URL in their web browsers can be navigated to a graphical user interface of the content management system. The content management system may require the users to log in to identify themselves with the content management system. The system uses the identity of the user to determine the visibility of the content and access to the content granted to the users. The user may be identified by the content management system as a member of one or more groups or to have roles identified as having access granted or restricted to a category of the content. The user may be identified as a member of a group, with the access level allowing seeing redacted versions of the content only.

A set of policy rules can be executed on the content and content metadata to determine whether access can be granted to the user. If the system determines that the user cannot be granted any access to the content, the user can be presented, via the graphical user interface of the content management repository, with a message and won't be able to proceed further. The message may inform that the access to the content is not granted.

If the system determines that the user is granted access to a redacted version of the content only, the content management system may render, e.g., in an embedded document viewer in the graphical user interface, a redacted version of the document and display the redacted version of the document. The user may not be capable of seeing any unredacted content.

If the system determines that the user is granted full view of the content, and the content is set to be redacted, the system renders the embedded document viewer in the graphical user interface and displays a redacted version of the document. A button or an indication may be shown on the graphical user interface informing the user that the user may see the unredacted version of the document. The user may click the button or the indication to see the unredacted version of the document.

If the user is granted full view of the content, and there are no other restrictions on the content, the system renders the embedded document viewer in the graphical user interface and displays the content in the form the content was originally archived.

In the existing content management systems such as Office 365®, a user may have access to the content and may start sharing one piece of the content, but the editing of the content may be restricted to the user. In the system of the present disclosure, elements of protection with action may be added to the content management system by making at least a part of content unavailable to a user.

The system may set retention rules, according to which, even if there is a change in the content, a history of change may be stored in the history logs, but records may not necessarily be implemented in the last version approved. The content-related management rules can be put into the content management repository to be applied and made available to external systems outside of the content management repository.

Referring now to the drawings, FIG. 1 illustrates an environment 100 within which systems and methods for secure sharing of documents via a content management repository can be implemented. The environment 100 may include a data network 110 (e.g., an Internet or a computing cloud), end user(s) 105, client device(s) 120 associated with the end user(s) 105, and a system 200 for secure sharing of documents via a content management repository. Client device(s) 120 may include a personal computer (PC), a desktop computer, a laptop, a smartphone, a tablet, or so forth.

The client device 120 may have a graphical user interface (GUI) shown as a graphical user interface 130 associated with the system 200. Furthermore, a web browser 140 may be running on the client device 120 and displayed using the graphical user interface 130. The web browser 140 may communicate with the system 200 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The system 200 can receive content restriction rules 155 for content 165 stored in the content management repository 190 and inject the content restriction rules 155 into policy rules 185. The system 200 may intercept an API call 160 for content 165 from the end user(s) 105. Upon intercepting the API call 160, the system 200 may dynamically filter the content 165 based on the content restriction rules 155.

The web browser 140 can establish a communication channel with the system 200 and generate and render virtual screens based on data received from the system 200. Specifically, the web browser 140 can render the filtered content 170 via the graphical user interface 130 to display the filtered content 170 to the end user(s) 105 on a screen 150 of the client device 120.

Figure 2:
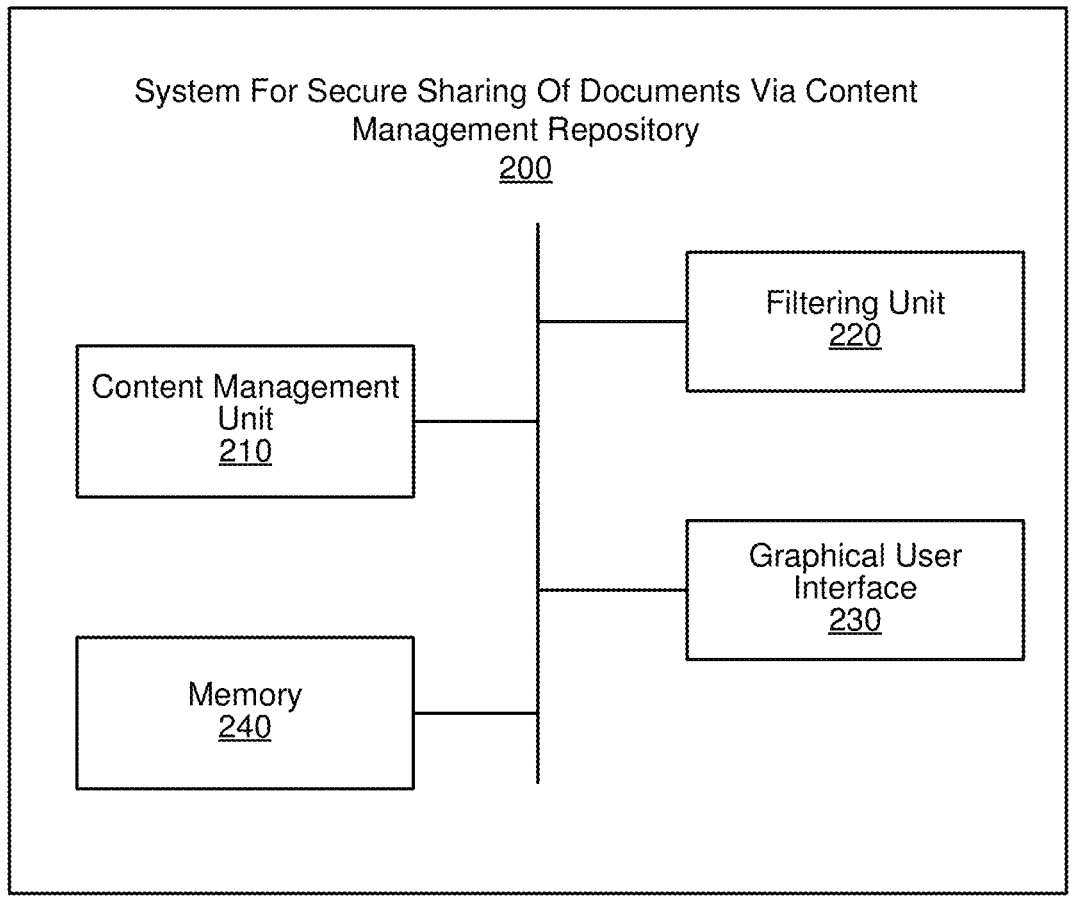
FIG. 2 shows a block diagram of a system for secure sharing of documents via a content management repository, according to an example embodiment.
Figure 6:
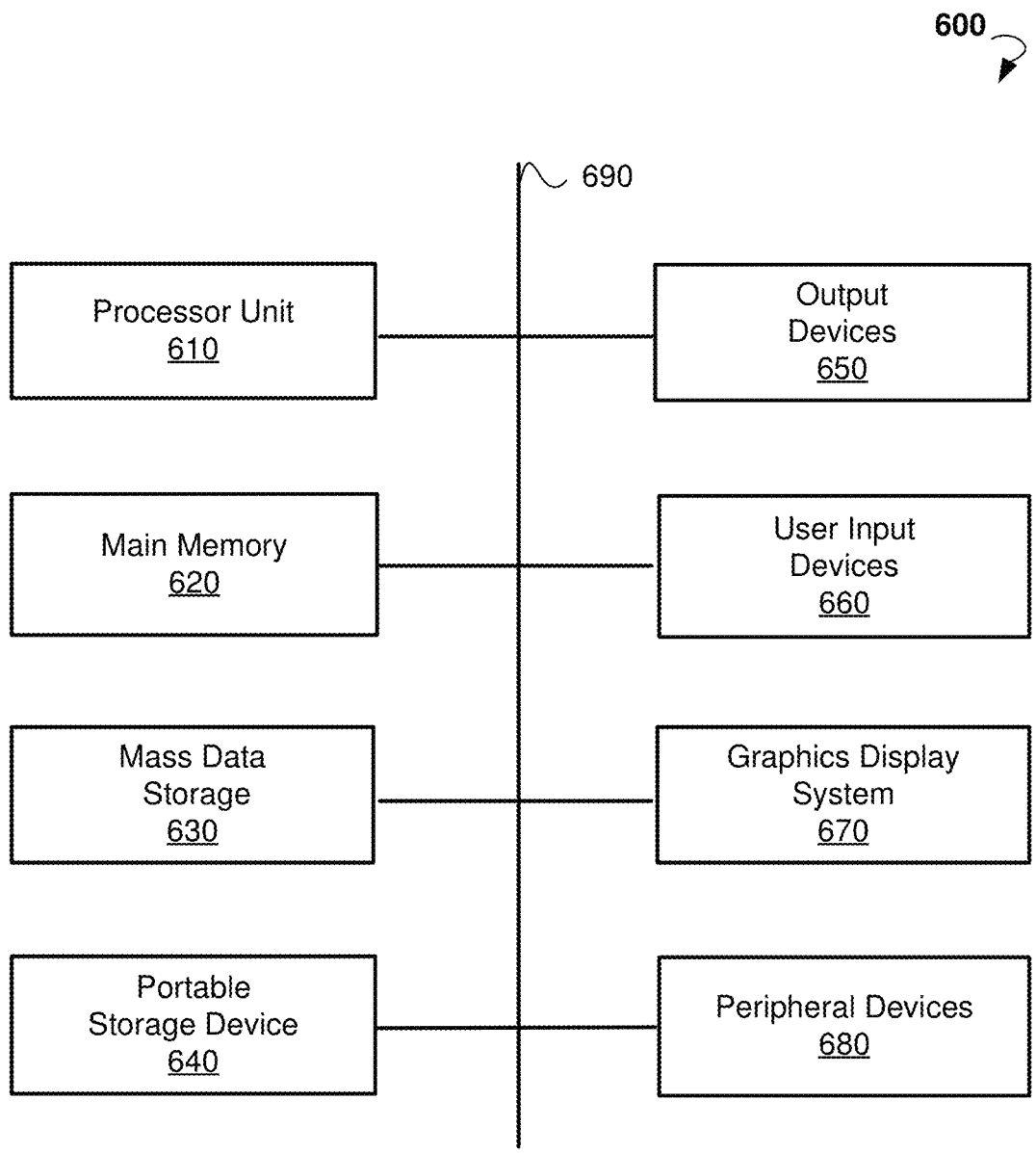
FIG. 6 shows a computing system suitable for implementing embodiments of the present disclosure.

FIG. 2 is a block diagram illustrating a system 200 for secure sharing of documents via a content management repository, according to an example embodiment. The system 200 may include a content management unit 210, a filtering unit 220, a GUI 230, and a memory 240. In an example embodiment, the operations performed by each of the content management unit 210, the filtering unit 220, and the GUI 230 may be performed by a processor. The memory 240 may store instructions executable by the processor. Example processors are shown in FIG. 6 as one or more processors processor units 610. The operations performed by each of the content management unit 210, the filtering unit 220, and the GUI 230 of the system 200 are described in detail below with reference to FIG. 3.

Figure 3:
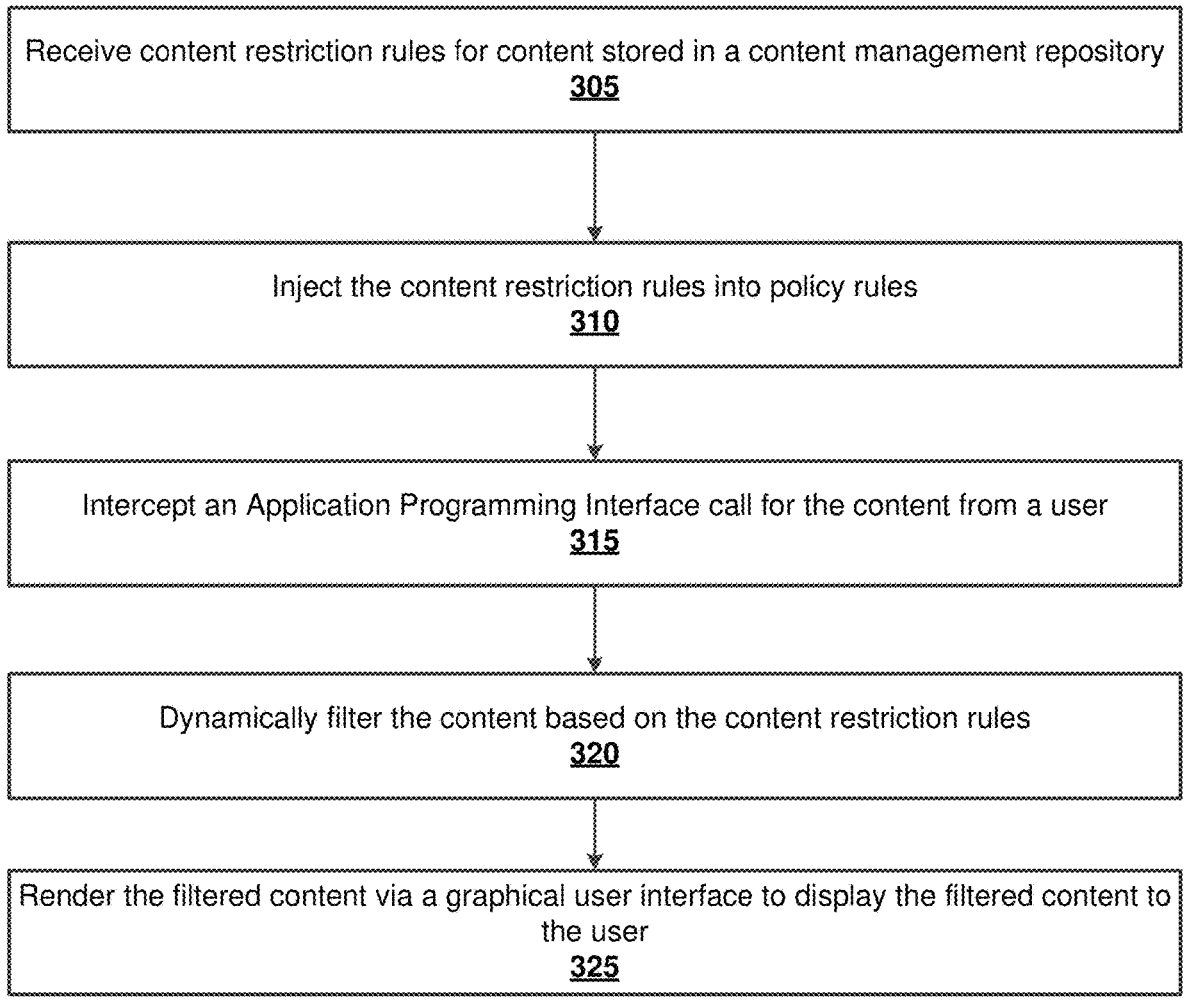
FIG. 3 shows a process flow diagram of a method for secure sharing of documents via a content management repository, according to an example embodiment.

FIG. 3 shows a process flow diagram of a method 300 for secure sharing of documents via a content management repository, according to an example embodiment. In some embodiments, the operations may be combined, performed in parallel, or performed in a different order. The method 300 may also include additional or fewer operations than those illustrated. The method 300 may be performed by processing logic that comprises hardware (e.g., decision making logic, dedicated logic, programmable logic, and microcode), software (such as software run on a general-purpose computer system or a dedicated machine), or a combination of both.

The method 300 may commence with receiving, by a content management unit, content restriction rules for content stored in the content management repository at operation 305. In an example embodiment, the content restriction rules may be associated with retention of the content, redaction of the content and granting access to a redacted version of the content, blocking the access to the content, granting the access to the content, and so forth.

Upon receiving the content restriction rules, the content restriction rules may be injected, by the content management unit, into policy rules at operation 310. The method 300 may further include intercepting, by the content management unit, an API call for the content from a user at operation 315. In an example embodiment, the interception of the API call for the content may include receiving an URL associated with the content in the content management repository. In some embodiments, the URL associated with the content may be shared with the user by a further user.

Upon intercepting the API call, the content may be dynamically filtered, by a filtering unit, based on the content restriction rules at operation 320. In an example embodiment, the filtering may include determining access privileges of the user based on the content restriction rules and redacting the content based the access privileges. The determination of the access privileges may include associating the user with a group of users. The group of users may be associated with content categories based on content metadata. The content metadata may be prefilled for the content using fields of information concerning the content.

In an example embodiment, the content restriction rules may include specifying expiration of the content (e.g., an expiration date, an expiration term, and so forth) for the group of users. More specifically, the content can be stored in the content management system (e.g., in a content management repository 190 shown in FIG. 1), such that the content management system can control when the content expires, for example, in thirty days. The term of expiration can be different for different users based on user roles, access rights, and the like, thereby providing different expiration dates for different users. Upon filtering the content, the filtered content may be rendered at operation 325. The filtered content may be rendered via a graphical user interface to display the filtered content to the user. In an example embodiment, the method 300 may further include presenting a message to the user upon the rendition of the filtered content. The message may indicate that access to at least a portion of the content is blocked for the user.

Figure 4:
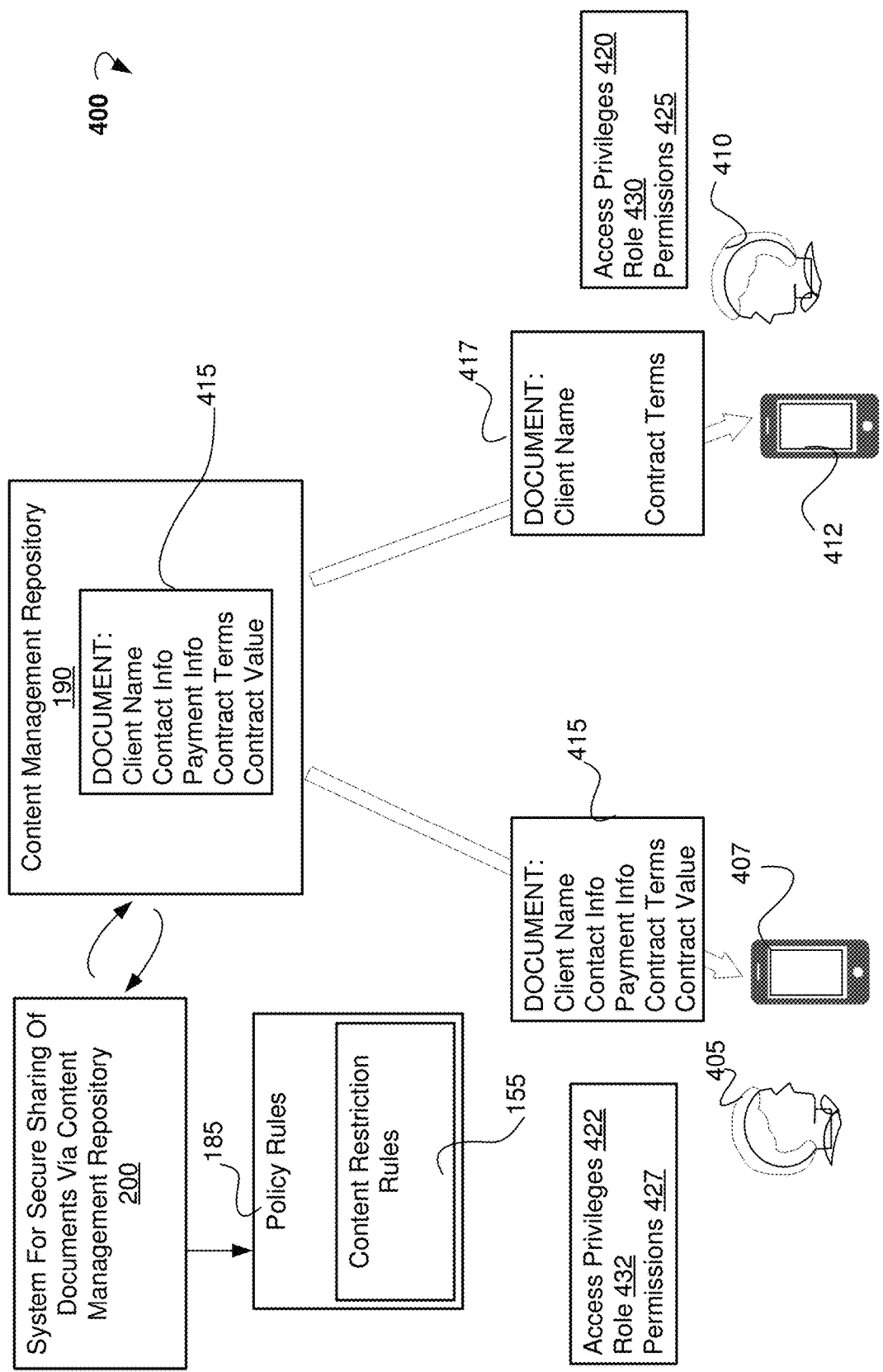
FIG. 4 is a schematic diagram showing secure sharing of documents using a system for secure sharing of documents via a content management repository, according to an example embodiment.

FIG. 4 is a schematic diagram 400 showing secure sharing of documents using a system for secure sharing of documents via a content management repository, according to an example embodiment. The system 200 provides users with a way to securely share documents. Users 405 and 410 may share, via client devices 407 and 412, respectively, one or more documents with each other by sending to each other links to the one or more documents stored in a content management repository 190. The system 200 can intercept the links to the documents in the content management repository 190 exchanged between the users 405 and 410 and exercise control over the documents based on the content restriction rules 155 stored in policy rules 185.

In an example embodiment, the user 405 can store a link to a document 415 in the system 200. Storing the link to the document 415 in the system 200 may include sending the link to any of users via any communication channels within the system 200, such as an email, a text message, and so forth. When the link is activated by any of users (e.g., by the user 410), the system 200 can determine and apply permissions that are specific to the user 410 that requested to open the link. The system 200 can determine the permissions based on access privileges 420 set for the user 410. The access privileges 420 may include permissions 425 set for the user 410 based on a role 430 (e.g., a position in a company, such as a manager) of the user 410. Access privileges may be set for each user independently or for groups of users.

The user 405 that sent the link to the document 415 to the user 410 may have different access privileges 422 than the access privileges 420 of the user 410. The user 405 may have a different role 432 (e.g., a director) than the role 430 of the user 410. Permissions 427 set for the user 405 based on the role 432 of the user 405 may be different from the permissions 425 set for the user 410. Therefore, the access privileges 422 for the user 405 may differ from the access privileges 420 for the user 410.

The document 415 may have content, such as a client name, a client contact information, a client payment information, contract terms, a contract value, and the like. The access privileges 422 for the user 405 may allow the user 405 to access all portions of the content of the document 415. Therefore, when the user 405 opens the document 415, all portions of the content of the document 415 may be rendered to the user 405.

The access privileges 420 for the user 410 may not allow the user 410 to access some portions of the content of the document 415. For example, the client contact information, the client payment information, and the contract value may be not allowed to be accessed by the user 410. Thus, as the user 410 is only allowed to see some portions or pages of the document 415, when the user 410 accesses the document 415, the content of the document 415 is filtered based on the access privileges 420. The user 410 is presented with filtered content 417 of the document 415. Specifically, only the portions or pages of the document 415 allowed for the user 410 to be accessed are rendered and displayed to the user 410 in form of the filtered content 417 of the document 415. For example, as the user 410 may be not allowed to see the client contact information, the client payment information, and the contract value, the filtered content 417 may include a redacted version of the document 415 in which the client contact information, the client payment information, and the contract value are removed or hidden and, hence, not displayed to the user 410. Thus, the system 200 can hide any information that is not pertinent to the role of the user 410.

Thus, when two different users (e.g., the user 405 and the user 410) receive a link associated with the content (e.g., the document 415), one user 405 can see the whole content because the user 405 has a role (e.g., a director) that allows to see the whole content, but another user 410 can only see some portion of the content, for example, a client name and contract terms, because the user 410 has a role (e.g., a manager) that does allows to see the whole content. Thus, different criteria and content restriction rules can be applied based on a role and permissions of the users accessing the document.

Figure 5:
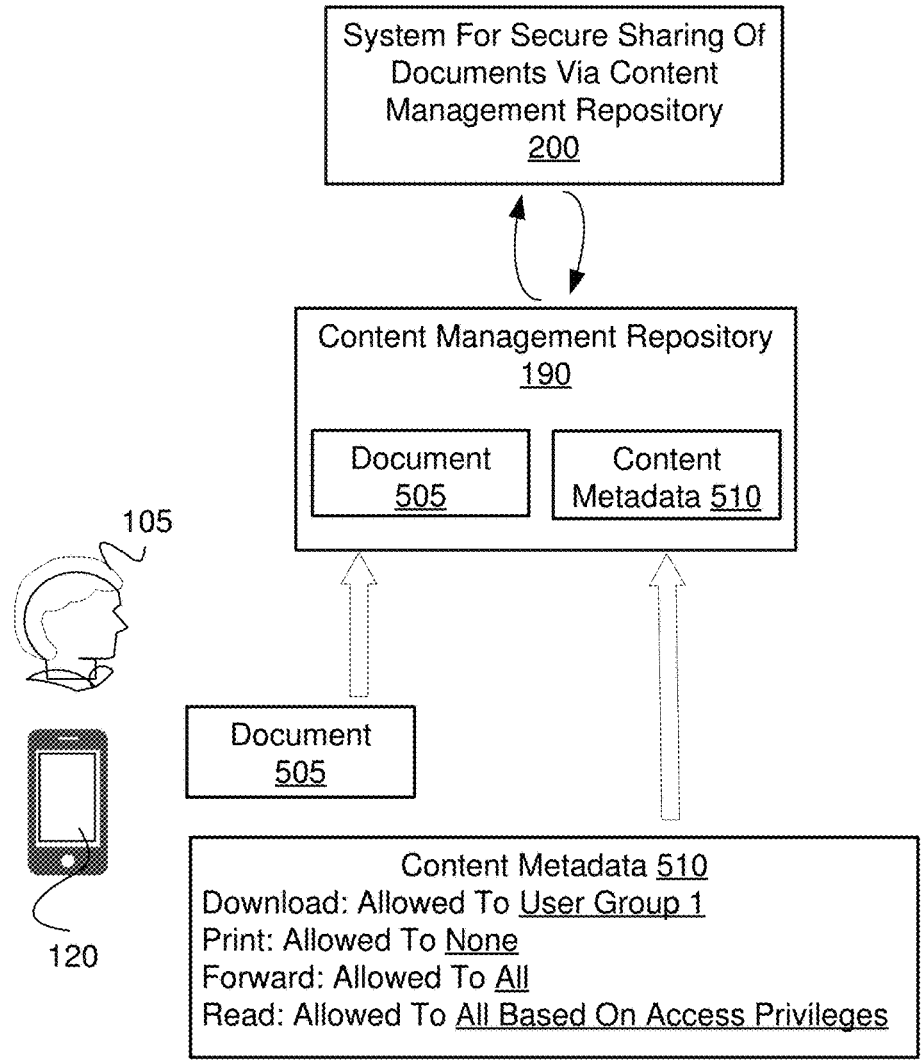
FIG. 5 is a schematic diagram showing content metadata, according to an example embodiment.

FIG. 5 is a schematic diagram 500 showing providing content metadata for content by a user, according to an example embodiment. In some embodiments, users can collaborate on the same document, e.g., a document stored in a content management repository 190 or in a cloud. However, all users may be able to see the same document, which can be a problem if some users are not intended for seeing some portions of the document. The system 200 allows presenting different content to different users based on predetermined rules, such that the content can be presented uniquely to certain users. Thus, an end user 105 that shares content, e.g., document 505, using a client device 120 can maintain control over the document 505 by specifying how the control can be shared and what other users can see or do with respect to the document 505. For example, the end user 105 may not want some users to download copies, print random copies, forward a document to users who should not have access, read portions of the document 505 that the users are not supposed to read, and so forth.

Upon uploading the document 505 into the content management repository 190 or any time later, the end user 105 can open content metadata 510 of the document 505. In some embodiments, the end user 105 may be prompted to fill in the content metadata 510 upon a request of the end user 105 to upload the document 505 into the content management repository 190. The content metadata 510 may include fields of information concerning the document 505.

The end user 105 may fill in any required fields of the content metadata 510 concerning the document 505 by selecting users, groups of users, or roles that are not allowed to perform actions with respect to the document 505, such as to download copies, print random copies, forward the document to users who should not have access, read portions of the document, and any other actions with respect to the document 505. Once the information filled in by the user in the content metadata 510 is captured, the content management repository 190 may store the content metadata 510. The content management repository 190 may categorize the document 505 based on the content metadata 510 entered by the end user 105. Categorizing of the document 505 may include setting permissions for users or groups of users to perform actions with respect to the document 505 based on the content metadata 510.

FIG. 6 illustrates an exemplary computer system 600 that may be used to implement some embodiments of the present disclosure. The computer system 600 of FIG. 6 may be implemented in the contexts of the system 200 shown in FIG. 2. The computer system 600 of FIG. 6 includes one or more processor units 610 and a main memory 620. The main memory 620 stores, in part, instructions and data for execution by the processor units 610. The main memory 620 stores the executable code when in operation, in this example. The computer system 600 of FIG. 6 further includes a mass data storage 630, a portable storage device 640, output devices 650, user input devices 660, a graphics display system 670, and peripheral devices 680.

The components shown in FIG. 6 are depicted as being connected via a single bus 690. The components may be connected through one or more data transport means. The processor unit 610 and the main memory 620 are connected via a local microprocessor bus, and the mass data storage 630, the peripheral device(s) 680, the portable storage device 640, and the graphics display system 670 are connected via one or more input/output (I/O) buses.

The mass data storage 630, which can be implemented with a magnetic disk drive, solid state drive, or an optical disk drive, is a non-volatile storage device for storing data and instructions for use by the processor unit 610. The mass data storage 630 stores the system software for implementing embodiments of the present disclosure for purposes of loading that software into the main memory 620.

The portable storage device 640 operates in conjunction with a portable non-volatile storage medium, such as a flash drive, floppy disk, compact disk, digital video disc, or Universal Serial Bus storage device, to input and output data and code to and from the computer system 600 of FIG. 6. The system software for implementing embodiments of the present disclosure is stored on such a portable medium and input to the computer system 600 via the portable storage device 640.

The user input devices 660 can provide a portion of a user interface. The user input devices 660 may include one or more microphones; an alphanumeric keypad, such as a keyboard, for inputting alphanumeric and other information; or a pointing device, such as a mouse, a trackball, stylus, or cursor direction keys. The user input devices 660 can also include a touchscreen. Additionally, the computer system 600 as shown in FIG. 6 includes the output devices 650. Suitable output devices 650 include speakers, printers, network interfaces, and monitors.

The graphics display system 670 can include a liquid crystal display or other suitable display device. The graphics display system 670 is configurable to receive textual and graphical information and process the information for output to the display device.

The peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer, a handheld computer system, a telephone, a mobile phone, a smartphone, a laptop computer, a mobile computer system, a workstation, a tablet, a phablet, a server, a minicomputer, a mainframe computer, a wearable device, or any other computer system. The computer system 600 may also include different bus configurations, networked platforms, multi-processor platforms, and the like. Various operating systems may be used including UNIX®, LINUX®, WINDOWS®, MAC OS®, PALM OS®, QNX®, ANDROID®, IOS®, CHROME®, TIZEN®, and other suitable operating systems.

The processing for various embodiments may be implemented in software that is cloud-based. In some embodiments, the computer system 600 is implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, various embodiments of systems and methods for secure sharing of documents via a content management repository have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A system for secure sharing of documents via a content management repository, the system comprising:
   a content management unit configured to:
      receive content restriction rules for content stored in the content management repository, the content restriction rules including assignments of users and user groups to content categories designating access to the content based on content metadata including fields of information prefilled by user input from a first user for selecting the users and user groups, the user input received at the content management repository at a time of archiving the content into the content management repository;

inject the received content restriction rules into policy rules;

intercept an Application Programming Interface (API) call for the content from a second user after the content is categorized automatically at the content management repository to at least one of the content categories based on the received user input; and provide a policy-based redaction of documents by specifying what metadata of a document the second user can view;

a filtering unit configured to dynamically filter the content based on the metadata specified by the content management unit;

a graphical user interface configured to render the filtered content to display the filtered content to the second user; and a memory communicatively coupled to the content management unit.

2. The system of claim 1, wherein the filtering of the content includes:
   determining, based on the content restriction rules, access privileges of the user; and
   redacting the content based on the access privileges.

3. The system of claim 2, wherein the determination of the access privileges includes associating the user with a group of users.

4. The system of claim 3, wherein the group of users is associated with a content category based on content metadata.

5. The system of claim 4, wherein the content metadata are prefilled for the content using fields of information concerning the content.

6. The system of claim 3, wherein the content restriction rules include specifying expiration of the content for the group of users.

7. The system of claim 1, wherein the content restriction rules are associated with one or more operations, the operations comprising: retention of the content, redaction of the content and granting access to a redacted version of the content, blocking the access to the content, and granting the access to the content.

8. The system of claim 1, wherein the interception of the API call for the content includes receiving a Uniform Resource Locator (URL) associated with the content in the content management repository.

9. The system of claim 8, wherein the URL associated with the content is shared with the user by a further user.

10. A method for secure sharing of documents via a content management repository, the method comprising:
    receiving, by a content management unit, content restriction rules for content stored in the content management repository, the content restriction rules including assignments of users and user groups to content categories designating access to the content based on content metadata including fields of information prefilled by user input from a first user for selecting the users and user groups, the user input received at the content management repository at a time of archiving the content into the content management repository;

categorizing the content automatically at the content management repository to at least one of the content categories based on the received user input;

injecting, by the content management unit, the received content restriction rules into policy rules;

providing a policy-based redaction of documents by specifying what metadata of a document a second user can view;

intercepting, by the content management unit, an Application Programming Interface (API) call for the content from the second user after the content is categorized;

dynamically filtering, by a filtering unit, the content based on the metadata specified by the content management unit; and rendering the filtered content via a graphical user interface to display the filtered content to the second user.

11. The method of claim 10, wherein the filtering of the content includes:
    determining, based on the content restriction rules, access privileges of the user; and
    redacting the content based on the access privileges.

12. The method of claim 11, wherein the determination of the access privileges includes associating the user with a group of users.

13. The method of claim 12, wherein the group of users is associated with a content category based on content metadata.

14. The method of claim 13, wherein the content metadata are prefilled for the content using fields of information concerning the content.

15. The method of claim 12, wherein the content restriction rules include specifying expiration of the content for the group of users.

16. The method of claim 10, wherein the content restriction rules are associated with one or more operations, the operations comprising: retention of the content, redaction of the content and granting access to a redacted version of the content, blocking the access to the content, and granting the access to the content.

17. The method of claim 10, wherein the interception of the API call for the content includes receiving a Uniform Resource Locator (URL) associated with the content in the content management repository.

18. The method of claim 17, wherein the URL associated with the content is shared with the user by a further user.

19. The method of claim 10, further comprising, upon the rendition of the filtered content, presenting a message to the user, the message indicating that access to at least a portion of the content is blocked for the user.

20. A non-transitory computer-readable storage medium having embodied thereon instructions, which when executed by at least one processor, perform steps of a method comprising:
    receiving, by a content management unit, content restriction rules for content stored in a content management repository, the content restriction rules including assignments of users and user groups to content categories designating access to the content based on content metadata including fields of information prefilled by user input from a first user for selecting the users and user groups, the user input received at the content management repository at a time of archiving the content into the content management repository;

categorizing the content automatically to at least one of the content categories at the content management repository to at least one of the content categories based on the received user input;
injecting, by the content management unit, the received content restriction rules into policy rules;
providing a policy-based redaction of documents by specifying what metadata of a document a second user can view;
intercepting, by the content management unit, an Application Programming Interface (API) call for the content from the second user after the content is categorized;
dynamically filtering, by a filtering unit, the content based on the metadata specified by the content management unit; and
rendering the filtered content via a graphical user interface to display the filtered content to the second user.

* * * * *